United States Patent [19]

Lagree et al.

[11] Patent Number: 5,638,295
[45] Date of Patent: Jun. 10, 1997

[54] TRANSFER SWITCH SYSTEM WITH SUBNETWORK

[75] Inventors: James L. Lagree, Robinson Township; James R. Hanna, Brighton Township; Bert Popovich, Carnegie, all of Pa.

[73] Assignee: Eaton Corporation, Cleveland, Ohio

[21] Appl. No.: 512,587

[22] Filed: Aug. 8, 1995

[51] Int. Cl.$^6$ .................................................. H02J 9/04
[52] U.S. Cl. .................. 364/492; 364/483; 364/493; 307/19; 307/18; 307/23; 307/64; 187/248; 187/290
[58] Field of Search .................. 364/492, 483, 364/493; 307/19, 87, 18, 20, 23, 24, 64, 66, 29, 125, 126, 131, 140; 323/234–236; 324/415; 335/7, 11, 28, 20, 158; 361/86, 88, 89, 81, 71, 74, 75, 83, 189; 187/247, 248, 290, 391, 393, 277

[56] References Cited

U.S. PATENT DOCUMENTS

| | | | |
|---|---|---|---|
| 4,142,609 | 3/1979 | Tachino | 187/290 |
| 4,379,499 | 4/1983 | Nowak | 187/290 |
| 4,747,061 | 5/1988 | Lagree et al. | 364/483 |
| 4,761,563 | 8/1988 | Ross et al. | 307/87 |
| 4,879,624 | 11/1989 | Jones et al. | 307/87 |
| 5,162,623 | 11/1992 | Tachino | 187/290 |

OTHER PUBLICATIONS

*Model 2000 Automatic Control System for Transfer and Bypass/Isolation Switches;* Russelectric Inc.; Form RMC 994; 1994; 1 P.

*The Premier Name in Automatic Transfer Switches;* Automatic Switch Co., Florham Park, New Jersey 07932; Publication No. 1106; pp.1–15.

Primary Examiner—Emanuel T. Voeltz
Assistant Examiner—Hal P. Wachsman
Attorney, Agent, or Firm—Martin J. Moran

[57] ABSTRACT

A transfer switch system includes a controller which sends separately timed restart signals over a communications network to an addressable relay associated with each load in order to sequentially restart the loads following a transfer. When the loads are elevators, the controller sends a prepare to transfer signal to each elevator through the associated addressable relay directing the elevator to park at a floor with its doors open and delays making a discretionary transfer until all elevators send a reply message over the network that they are appropriately parked. A message from the utility directing a reduction in use of their power can be sent to the controller over the communications network through an additional remote station. The controller can then transfer to the alternate power source and/or send messages to selected loads to shut down.

1 Claim, 2 Drawing Sheets

5,638,295

TRANSFER SWITCH SYSTEM WITH SUBNETWORK

BACKGROUND OF THE INVENTION

1. Field of the Invention

This invention relates to transfer switch systems for switching between alternate power sources for loads connected to a load bus and in particular to such a system including a communications network for coordinating transfers between sources with operation of the loads.

2. Background Information

Transfer systems for supplying alternate electric power sources to specified loads are well known. Often such systems provide power from a commercial power source and an auxiliary power source such as a local, engine driven generator. Such transfer systems are widely used in applications such as, for example, hospitals, computer installations and industrial processes which require continuous power. Many of these transfer switches effect an open transition between the two power sources. That is, the load bus is disconnected from the one source before it is connected to the other source in order to avoid the problems associated with interconnection of unsynchronized sources. This results in interruption of power to the loads. Often the auxiliary power source is not capable of supplying the large in-rush currents associated with simultaneous reenergization of a number of loads such as motors. Typically in such a situation, the loads are reenergized sequentially. The transfer switch includes a separate timer connected by separate wiring to each load. There is no indication to the transfer switch that the loads have responded to the restart signal.

Switching between power sources with an open transition creates special problems when the loads include elevators. Typically, codes require that the elevators be parked at a floor with the doors open before a discretionary transfer between power sources is made. The usual solution is to send a signal to each elevator over separate dedicated leads commanding the elevator to park with its doors open. The transfer switch delays the transfer for a period of time presumed to be long enough to permit the elevators to comply. There is no indication that the elevators have responded.

Many utilities today offer preferential rates to customers who agree to terminate or reduce power usage within a specified time of receipt of notice of the need for a power reduction. Typically, this notification is processed manually to implement the power reduction.

There is a need for an improved transfer switch system with improved coordination between the transfer switch and the loads.

There is also a need for simplifying and control of the loads by the transfer switch and making it easier to accommodate different load configurations.

There is also a need for providing feedback to the transfer switch of the response of the load to commands from the transfer switch especially where the loads are elevators.

There is also a need for an arrangement for automatically responding to notice from a supplier of commercial power to reduce power usage in order to take advantage of preferential rates.

SUMMARY OF THE INVENTION

These needs and others are satisfied by the invention which is directed to a transfer switch system for selectively providing power to a plurality of loads on a load bus from alternate power sources having improved means coordinating transfer between the power sources with operation of the loads to which power is provided. A controller selectively operates switches to transfer from one power source supplying power to the loads to the other power source. Following a transfer which causes the loads to become deenergized, the controller sends separate messages spaced in time over a communications network to remote input/output devices associated with each of the loads to sequentially restart the loads. Preferably, the remote input/output devices send messages back to the controller over the communications network when the associated load has restarted.

When the loads include elevators, the controller sends a prepare to transfer message to the remote input/output devices associated with each of the; elevators, directing the associated elevator to assume predetermined conditions such as stopping at a floor with the doors open. The remote input/output device then sends a return message to the controller indicating that the elevator has assumed the predetermined conditions.

As another aspect of the invention, when one of the power sources is a commercial power source, a station responsive to a remote signal from the commercial power company directing a reduction in the use of commercial power sends a transfer message to the controller which causes the controller to transfer from the commercial power source to the other power source.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
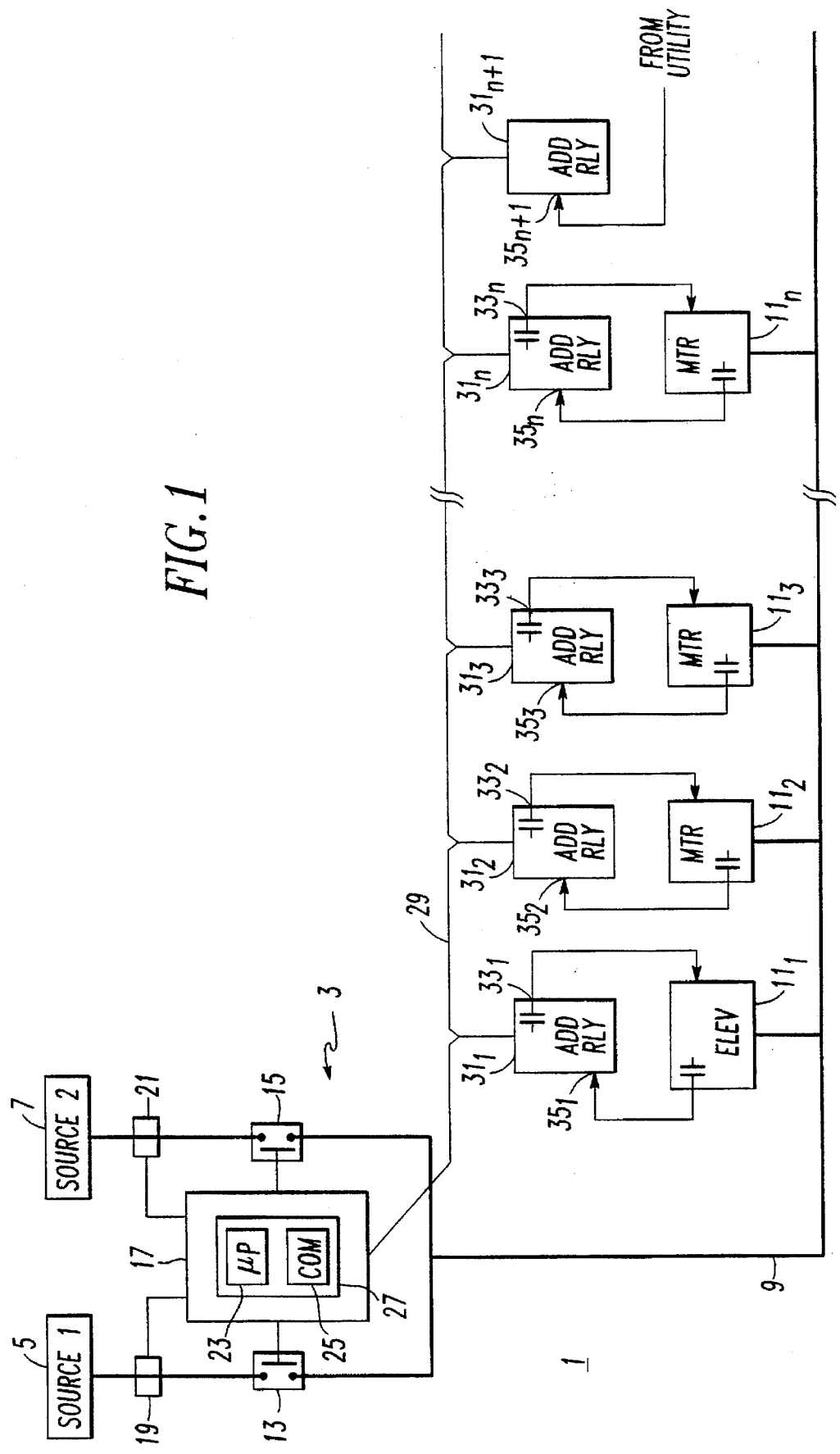
FIG. 1 is a block diagram of a transfer switch system in accordance with the invention.

FIG. 1 illustrates a power distribution system 1 in which a transfer switch system 3 in accordance with the invention controls connection of either a first power source 5 or a second power source 7 to a load bus 9 supplying power to a number of loads $11_1$–$11_n$. The transfer switch system 3 includes a first switch 13 for connecting a first source 5 to the load bus and a second switch 15 for connecting the second source 7 to the load bus. A controller 17 monitors the first source 5 and second source 7 through sensors 19 and 21, respectively, and operates the switches 13 and 15 to selectively connect one of the sources to the load bus 9, as is known in the art. For instance, where the first source 5 is a commercial power source and the second source 7 is an auxiliary power source having an engine driven generator, the controller 17 can designate the commercial power source 5 as the preferred power source which will be connected to the load bus 9 as long as the monitored parameters of the commercial power source are within prescribed ranges. If the commercial power source does not remain within the prescribed limits, or for test purposes, or other reasons to be described, the commercial power source 5 can be disconnected from the load bus 9, and replaced by the auxiliary power generator 7. As mentioned, transfer from the commercial power source 5 to the auxiliary power source 7 is effected by an open transition. This temporary loss of power to the load bus causes the loads to drop out. As the auxiliary power source 7 does not have the capability to support the in-rush current of starting all of the loads 11 simultaneously, the controller 17 sequentially restarts the loads. In order to accomplish this, the controller 17 has a microprocessor 23 which generates separate start messages for each of the loads $11_1$–$11_n$. A communications unit 25, which for example can be combined with the microprocessor 21 on an integrated circuit chip 27 such as the type described in U.S. Pat. No. 5,270,898 interfaces with a communications network 29. The communications network 29 in turn interfaces with a remote input/output device $31_1$–$31_n$, such as an addressable relay, associated with each of the loads $11_1$–$11_n$. Each of the addressable relays 31 includes contact outputs $33_1$–$33_n$ through which the relay can send signals to the associated load, and contact inputs $35_1$–$35_n$ through which the addressable relay receives signals from the associated load. The controller 17 communicates with the addressable relay 31 associated with a particular load 11 by sending a message addressed to the addressable relay over the communications network 29. Return messages from the addressable relay are transmitted over the network 29 back to the controller 17. Thus, when the controller 17 transfers from the first power source to the second power source, restart messages are generated for each of the loads $11_1$–$11_n$. These messages are separated in time by a timer within the microprocessor 23. These separate messages are addressed to the associated addressable relay which provides a signal at its contact output which re-starts the associated load. When the load restarts, a signal is applied to the contact input 35 of the associated addressable relay which sends the restart message over the communications network 29 to the controller indicating that the load has responded to the start signal.

In some instances, the load is an elevator such as in the case of load $11_1$. As indicated previously, codes require that the elevator be brought to a floor and the doors opened thereby creating a predetermined condition before a discretionary transfer is made which would interrupt power to the elevator. Thus, when a discretionary transfer is to be made between power sources, either from the source 1 to the source 2 or vice versa, the controller 17 first sends a message to the addressable relay $31_1$ associated with the elevator directing that the elevator park at a floor and open its doors. The floor at which the elevator parks could be the floor at which the elevator is already located, the next floor at which a moving elevator can stop, or a designated floor. The addressable relay $31_1$ sends the park signal to the elevator 11 through its contact output $33_1$. When the elevator is parked and its doors are opened, it generates a signal which is received by the addressable relay $31_1$ contact input $35_1$. The addressable relay $31_1$ then sends a ready to transfer signal back to the controller over the communications network 29. When there are a plurality of elevators, the controller delays a transfer to another power source until messages are received from all of the elevators that they are parked and ready for the transfer.

As also mentioned above, many utilities offer preferential rates to customers who will reduce their power consumption within a predetermined time interval of receiving notification to do so. This is used by the utility to manage peak demand. Thus, another addressable relay $31_{n+1}$ having the signal from the utility applied to its contact input $35_{n+1}$ is connected to the communications network 29. When the signal to reduce power is received from the utility, this addressable relay $31_{n+1}$ sends an appropriate message to the controller 17 over the network 29. The controller 17 can then take appropriate action. It can make a transfer to the auxiliary power system, or alternatively it can selectively shed load by sending messages over the communications network 29 to certain of the addressable relays 31 to disconnect the associated load 11. Both of these actions may be taken where the auxiliary source is not able to provide power to all of the loads.

Figure 2:
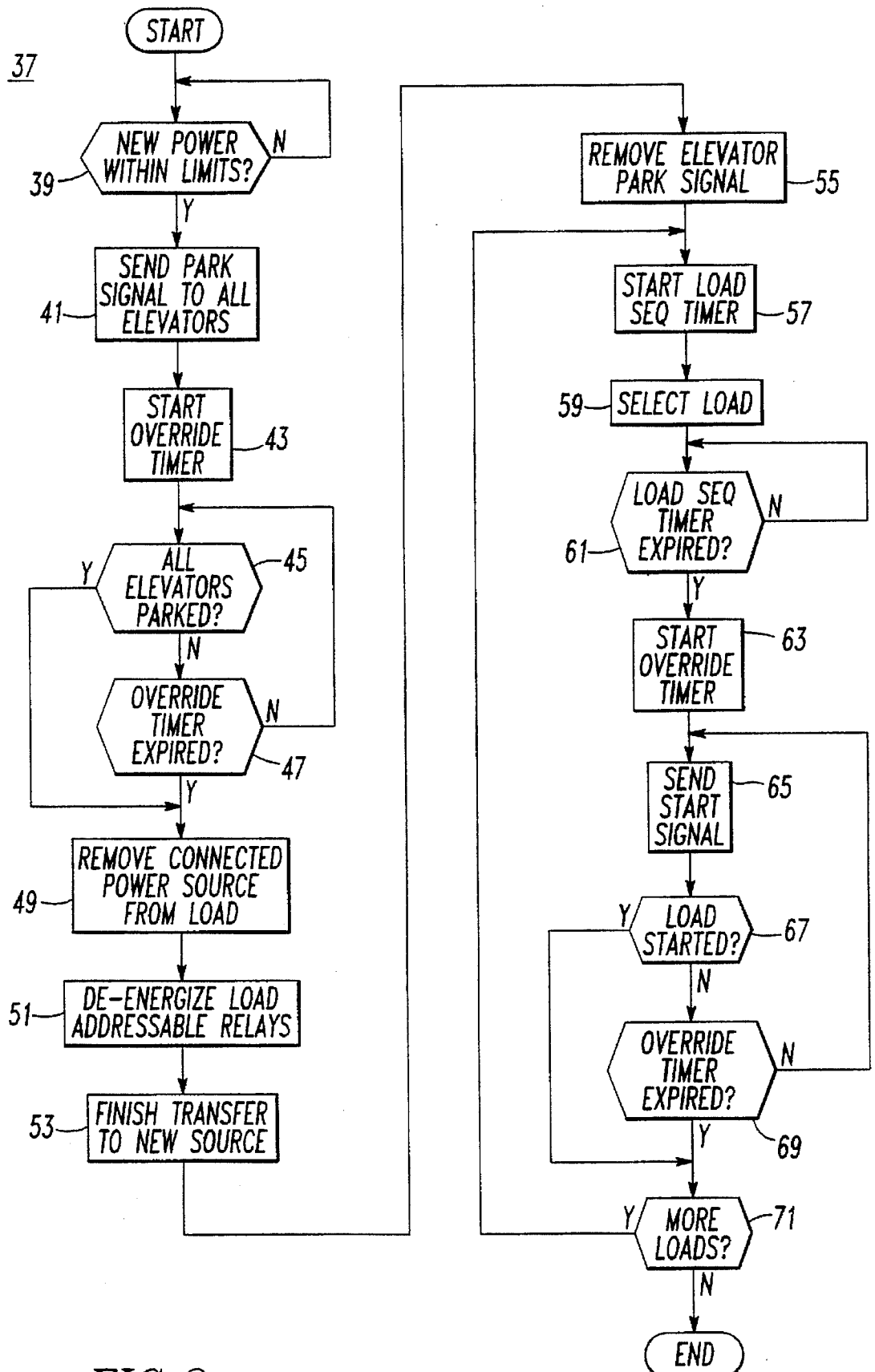
FIG. 2 is a flowchart of a routine utilized in the implementation of the invention.

A flow-chart for suitable routine 37 for use by the microprocessor 23 to implement the above sequencing is illustrated in FIG. 2. When the microprocessor 23 determines that a transfer is to be made between two sources, the routine makes sure at 39 that the new power is within limits. For instance, if a transfer is to be made to an engine driven generator, it must be determined that the generator has come up to speed and that the voltage and the frequency are within limits. When the new power source is ready for the transfer, park signals are sent to the elevators at 41 and an override timer is started at 43. The elevators report back when they are parked as indicated at 45. While it is preferable to have positive feedback that all of the elevators have parked, the process cannot be disabled if an elevator does not respond. Hence, even if all of the elevators have not indicated that they have parked with their doors open, if the override timer expires as indicated at 47, the routine moves on and the connected power source is disconnected from the load at 49. The loads are then disconnected from the load bus through the addressable relays as indicated at 51. The new source is then connected to the load bus at 53 and the park elevator signal is removed from all of the addressable relays at 55.

The loads are then sequentially reenergized beginning with the start of a load sequence timer at 57. A load to be started is then selected at 59 and when the load sequence timer is timed-out at 61 an override timer is started at 63 and the start signal is sent to the addressable relay associated with the selected load at 65. The load reports back over the network when it has started as indicated at 67. Again, if the proper response is not received back from the load, the system waits until time out of the override timer at 69. This starting sequence is repeated until all the loads have been started as indicated at 71.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A transfer switch system for selectively switching electrical load power on a load bus from a first source of electrical power to a second source of electrical power, said load interconnected to a plurality of elevators, comprising:

a plurality of input/output means each of which is interconnected to one of said plurality of elevators for receiving elevator status commands and for producing status verification signals; and control means interconnected with each of said plurality of said input/output means for providing an elevator status command for commanding said plurality of said elevators to an elevator disposition, then for receiving status verification signals from said input/output means associated with each said elevator thusly commanded that said commanded elevator disposition has been achieved, then after said verification signals have been received from all of said input/output means or after a predetermined time period has expired after said elevator command signal has been provided, which ever occurs first, causing said first source of electrical power to be disconnected from said load bus and second source of electrical power to be connected to said load bus.

* * * * *